UNITED STATES PATENT OFFICE 2,287,155

PHOSPHORIC ACID DICHLORIDES OF 4-AMINO BENZENE SULPHONAMIDE AND PROCESS FOR THE MANUFACTURE OF SAME

Kurt Warnat, Basel, Switzerland, assignor to Hoffmann-La Roche Inc., Nutley, N. J., a corporation of New Jersey No Drawing. Application May 1, 1939, Serial No. 271,162. In Germany May 16, 1938

9 Claims. (Cl. 260—397.7)

It has been found that on heating with phosphorus oxychloride, 4-amino benzene sulphonamides of the general formula

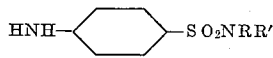

in which R and R' represent hydrogen or lower alkyl radicals, are transformed into dichlorides of substituted phosphoric acids of the general formula

The free 4-amino benzene sulphonamides or their salts can be used for the reaction. The isolation of the condensation product may be effected by pouring the reaction mixture into a solvent, for instance into petroleum ether, in which the condensation product is insoluble, or by distilling off the surplus phosphorus oxychloride, if so desired, under reduced pressure.

These phosphoric acid dichlorides of 4-amino benzene sulphonamides are important intermediate products for the manufacture of easily soluble, injectable medicinal preparations having a bactericidal action. By reaction of these dichlorides with ammonia or alkyl amine, alkali soluble phosphamic acids are obtained. The reaction with caustic alkalis yields alkali soluble phosphoric acids of 4-amino benzene sulphonamides, and condensation with alcohols or phenols leads to phosphoric ester acids.

Example 1

40 parts by weight of sulphanilamide hydrochloride are heated with 100 parts by weight of phosphorus oxychloride for 2 hours under a reflux condenser. A rapid evolution of hydrochloric acid sets in. After about 1 hour a clear mobile solution is obtained. This hot solution is stirred into 200 parts by weight of benzene, whereby surplus phosphorus oxychloride goes into solution, while the reaction product solidifies. The product is again finely ground with 100 parts by weight of benzene in order to remove the remainder of the phosphorus oxychloride.

The phosphoric acid dichloride of the formula $C_6H_7O_3N_2SPCl_2$ thus obtained in quantitative yield forms a slightly coloured powder which reacts vigorously with alkalis or ammonia while splitting off 2 mols of hydrochloric acid.

HCl calculated 24.54 per cent, found 25.06 per cent.

Example 2

30 parts by weight of sulphanilamide are heated to boiling with 100 parts by weight of phosphorus oxychloride for 3-4 hours under a reflux condenser. The working up is effected as described in Example 1. The same phosphoric acid dichloride is obtained.

Example 3

30 parts by weight of 4-amino benzene sulphonic acid methyl amide are boiled with 100 parts by weight of phosphorus oxychloride for 2-3 hours under a reflux condenser. The clear solution is introduced into 100 parts by weight of benzene in order to remove surplus phosphorus oxychloride. For the purpose of completely removing the phosphorus oxychloride the crude product is twice finely ground each time with 100 parts by weight of petroleum ether. Phosphorus dichloride of the formula $C_7H_9O_3N_2SPCl_2$ is obtained.

I claim:

1. A compound of the formula

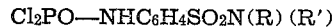

wherein R and R' are radicals selected from the group consisting of hydrogen and lower alkyl radicals.

2. 4-(dichlorophosphamyl) benzene sulphonamide.

3. 4-(dichlorophosphamyl) benzene sulphonmethylamide.

4. A process for the manufacture of a phosphoric acid dichloride of a 4-amino benzene sulphonamide of the general formula

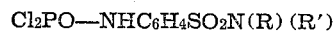

wherein R and R' are radicals selected from the group consisting of hydrogen and lower alkyl radicals comprising heating a compound selected from the group consisting of the corresponding free 4-amino benzene sulphonamide and a strong mineral acid salt of it with phosphorous oxychloride.

5. A process for the manufacture of a phosphoric acid dichloride of a 4-amino-benzene sulphonamide of the general formula

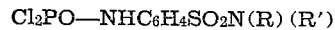

wherein R and R' are radicals selected from the group consisting of hydrogen and lower alkyl radicals comprising heating a compound selected from the group consisting of the corresponding free 4-amino benzene sulphonamide and a strong mineral acid salt of it with phosphorous oxychloride and distilling off the surplus phosphorous oxychloride to isolate the condensation product formed.

6. A process for the manufacture of a phosphoric acid dichloride of a 4-amino benzene sulphonamide of the general formula

wherein R and R' are radicals selected from the group consisting of hydrogen and lower alkyl radicals comprising heating a compound selected from the group consisting of the corresponding free 4-amino benzene sulphonamide and a strong mineral acid salt of it with phosphorous oxychloride and treating the reaction mixture with a solvent in which the condensation product is insoluble to isolate the reaction product.

7. A process for the manufacture of 4-(dichlorophosphamyl) benzene sulphonamide comprising heating sulphanilamide in the presence of phosphorous oxychloride.

8. A process for the manufacture of 4-(dichlorophosphamyl) benzene sulphonamide comprising heating sulphanilamide in the presence of phosphorous oxychloride and stirring the solution into benzene whereby the reaction product solidifies.

9. A process of solubilizing para-amino-benzene sulphonamides which comprises reacting a para-amino-benzene sulphonamide with a phosphorus oxychloride and treating the reaction product with a caustic alkali.

KURT WARNAT.